United States Patent

Dalyai

[15] 3,681,622

[45] Aug. 1, 1972

[54] LATCHING PULSE GENERATOR INCLUDING A MONOSTABLE MULTIVIBRATOR

[72] Inventor: Stephen Attila Dalyai, Old Bridge, N.J.

[73] Assignee: Bell Telephone Laboratories, Incorporated, Murray Hill, N.J.

[22] Filed: Dec. 24, 1970

[21] Appl. No.: 101,211

[52] U.S. Cl. ....................307/273, 307/276, 307/289

[51] Int. Cl. ..............................................H03k 3/26

[58] Field of Search......307/217, 247, 273, 289, 288, 307/276; 328/195, 196, 207, 99

[56] References Cited

UNITED STATES PATENTS 3,125,691 3/1964 Astheimer.................307/273 X
3,530,314 9/1970 Foerster........................307/273
2,827,574 3/1958 Schneider.................307/276 X
2,986,649 5/1961 Wray........................307/276 X
3,187,201 6/1965 Eastman et al............307/273 X
3,008,088 11/1961 Beeler.......................328/207 X

*Primary Examiner*—Stanley D. Miller, Jr.
*Attorney*—R. J. Guenther and Kenneth B. Hamlin

[57] ABSTRACT

A monostable multivibrator used as a pulse generator is coupled with an auxiliary transistor such that once the multivibrator has been triggered and an output pulse generated, the multivibrator "latches" and further attempts at triggering are ignored until an "unlatching" signal is applied.

12 Claims, 1 Drawing Figure

PATENTED AUG 1 1972
3,681,622
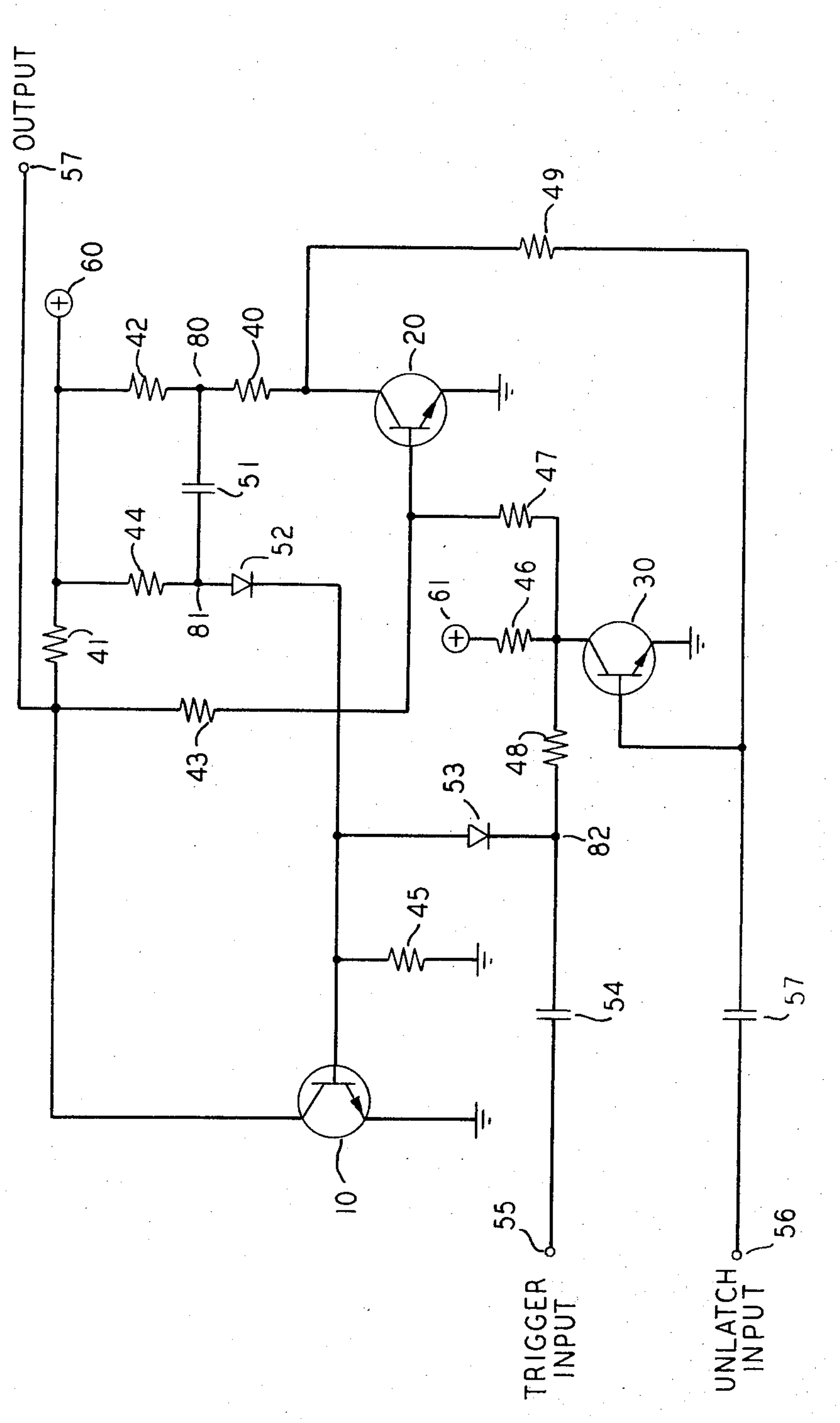
INVENTOR
S. A. DALYAI
BY D. E. Snedeker
ATTORNEY

LATCHING PULSE GENERATOR INCLUDING A MONOSTABLE MULTIVIBRATOR

BACKGROUND OF THE INVENTION

The present invention relates to pulse generators, and specifically to "latching" pulse generators.

A latching pulse generator may be defined as a triggered source of electrical pulses which "latches" after it is triggered so that further trigger signals will be ignored for some subsequent period of time, herein referred to as the latching period. Such latching arrangements are employed, for example, to prevent generator response to extraneous signals which derive from and immediately follow the original trigger, such as through relay chatter or multipath reception. Latching arrangements with somewhat longer latching periods are also employed, to preclude response to non-extraneous triggers which are nevertheless to be ignored because they occur before the circuit has had time to completely return to its quiescent state. This latter mode of operation is often employed in conjunction with monostable multivibrators wherein an unacceptably shortened output pulse may result if the multivibrator is triggered before the timing capacitor has fully recharged.

In known latching arrangements, the latching period is typically defined as a predetermined interval of time, such as by means of an R-C timing circuit. However, in applications requiring either randomly variable or relatively long latching periods, the constraint of a predetermined latching period duration has been found to be unacceptable. A typical example of such an application is a communication system in which activation of a constituent part, say a code sender, is contingent upon the occurrence of any one of a number of randomly occurring system events, only the first of which is to induce the activation within a given time period. Sometimes it is desired, for example, that the generator remain latched until some specific event occurs, or until some point in time, denoted, for example, by a clock pulse is reached.

SUMMARY OF THE INVENTION

It is therefore a general object of this invention to provide a simple, compact and economical latching pulse generator.

It is a more specific object of this invention to provide a latching pulse generator having a controllable latching period.

Another object of this invention is to provide a latching pulse generator, which remains latched until reception of an unlatching signal.

According to a feature of my invention, these and other objects are realized in a specific embodiment of a latching pulse generator comprising a monostable multivibrator having first and second transistors, and a third transistor interconnected with the second so as to provide a bistable relationship between them. When the multivibrator is in its conventional first stable state, the first transistor is ON and the second is OFF; and because of the bistable relationship between the second and third transistors, the latter is ON. When the multivibrator is triggered into its quasi-stable state by a signal applied to the first transistor, all three transistors switch. At the end of the quasi-stable state, the first transistor returns ON in conventional manner but the second transistor does not turn OFF in response thereto, it being held ON because of the OFF state of the third transistor. The multivibrator is thus latched in a non-conventional second stable state in which both first and second transistors are ON, and the third transistor is OFF. The multivibrator cannot be retriggered from this state since both transistors thereof are ON and consequently, the regenerative action necessary to sustain a transition back to the quasi-stable state cannot be effected. The multivibrator remains in this latched condition until the third transistor is turned ON, such as by an unlatching signal applied thereto, thus allowing the second transistor to turn OFF, and thereby returning the multivibrator to its first stable state.

Even though the multivibrator cannot be triggered into its quasi-stable state when it is in its second stable (latched) state, the first transistor may, nevertheless, be momentarily turned OFF if trigger signals are applied thereto, and a voltage spike will be generated at the output. In some applications, such a spike may not be objectionable if it is made sufficiently narrow. This may be achieved, for example, by application of the triggering signals through a capacitor which has a small time constant associated with it.

In other applications, however, a voltage spike generated while the multivibrator is latched might be erroneously interpreted as an output pulse, no matter how narrow the spike is. Therefore, according to another feature of my invention, circuitry including the third transistor is provided so as to prevent transmission of trigger signals to the first transistor of the latched multivibrator.

BRIEF DESCRIPTION OF THE DRAWING

The above and other objects and features of the invention will be more fully apparent from a consideration of the following detailed description and the accompanying drawing which illustrates a preferred embodiment of a latching pulse generator in accordance with the invention.

DETAILED DESCRIPTION

The drawing shows a pulse generator comprising transistors 10 and 20 interconnected to form a monostable multivibrator. The emitters of transistors 10 and 20 are connected to ground and the collectors thereof are connected to voltage source 60, transistor 10 through collector resistor 41 and transistor 20 through collector resistors 40 and 42. The base of transistor 20 is connected to the collector of transistor 10 through resistor 43, and the base of transistor 10 is connected to the collector of transistor 20 through diode 52, point 81, timing capacitor 51, point 80 and resistor 40. Resistor 44 connects point 81, and thus the anode of diode 52, to source 60. Additionally, the base of transistor 10 is connected to ground through resistor 45, and to triggering input terminal 55 through diode 53, point 82 and coupling capacitor 54. Output terminal 57 is connected to the collector of transistor 10.

In accordance with the invention, the pulse generator is provided with a controllable latching period by an interconnection of transistors 20 and 30 which provides a bistable relationship therebetween. The emitter of transistor 30 is connected to ground and its base is connected both to unlatching input terminal 56 through coupling capacitor 57 and to the collector of transistor 20 through resistor 49. The collector of transistor 30 is connected to source 61 through resistor 46 and to the base of transistor 20 through resistor 47. The collector of transistor 30 is also connected through resistor 48 to point 82, and thus to the cathode of diode 53.

When the multivibrator is in its conventional or first stable state, transistor 10 is ON, saturation base current being provided from source 60 through resistor 44 and diode 52. Similarly, transistor 30 is ON, saturation base current being provided from source 60 through resistors 42, 40 and 49. Transistor 20 is OFF since its base is connected to ground through resistor 47 and transistor 30, and through resistor 43 and transistor 10.

The multivibrator is triggered into its quasi-stable state by a negative going signal at terminal 55, which is transmitted through coupling capacitor 54 and diode 53 to the base of transistor 10. As transistor 10 switches to a nonconducting state thereby, regenerative action is initiated and transistor 20 switches to a conducting state. Since the base of transistor 30 is connected to ground through resistor 49 and transistor 20, transistor 30 switches to a nonconducting state. Thus, all three transistors 10, 20 and 30 switch when the transition to the quasi-stable state is effected, the switching of transistor 10 producing an output signal at terminal 57.

The multivibrator remains in its quasi-stable state until the voltage at point 81, which rises exponentially toward source 60 as capacitor 51 charges, attains sufficient magnitude to forward bias both diode 52 (which was reversed biased when the transition to the quasi-stable state was effected) and the base-emitter junction of transistor 10. At this instant, the quasi-stable state terminates. Transistor 10 resaturates, its collector returns to ground potential, and the output signal at terminal 57 ends. However, since transistor 30 is cut off, transistor 20 remains in saturation notwithstanding the resaturation of transistor 10, because base current sufficient to saturate transistor 20 is supplied from source 61 through resistors 46 and 47.

The multivibrator is thus latched in a second stable state in which transistors 10 and 20 are in saturation and transistor 30 is in cut-off. The multivibrator cannot be triggered by a signal at terminal 55 because diode 53 is reverse biased by source 61, which is now connected to its cathode through resistors 46 and 48. Therefore the path for triggering pulses from terminal 55 to the base of transistor 10 is effectively blocked. The multivibrator may be retriggered only if it is first returned to its first stable state. This may be accomplished by a positive going signal at terminal 56 which is transmitted through capacitor 57 to the base of transistor 30, where it switches transistor 30 into saturation. When transistor 30 is thus turned ON, ground potential is extended through resistor 47 to the base of transistor 20 which is thereby switched OFF. Upon the switching of transistor 20, transistor 30 is maintained in saturation by source 60 over the previously traced path. The multivibrator is thus returned to its first stable state from which state it may be retriggered by a subsequent signal at terminal 55.

In accordance with one aspect of the invention, resistor 48 may be connected to ground instead of to the collector of transistor 30. With resistor 48 connected to ground, diode 53 will not be reverse biased when the multivibrator is latched, and thus trigger signals at terminal 55 will be applied to the base of transistor 10 and will momentarily cut it off. However, the multivibrator cannot be triggered into its quasi-stable state from this latched state because any rise in voltage at the collector of transistor 10 has no effect on the saturation collector current of transistor 20, and therefore the negative voltage transition necessary at node 80 to sustain regenerative action cannot be generated. Thus, any output signal at terminal 57 due to a trigger signal at terminal 55 will persist only for as long as the effect of the trigger signal is felt at the base of transistor 10. The duration of an output signal thus generated is principally determined by the time constant associated with capacitor 54 and can be made very short by making the value of capacitor 54, for example, very small.

Although a specific multivibrator circuit is employed in the illustrative embodiment, it is to be understood that the invention may be implemented with any of a variety of multivibrators.

What is claimed is:

1. A latching pulse generator comprising a monostable multivibrator including first and second transistors and circuit means normally operative for switching said second transistor in response to the switching of said first transistor, said multivibrator having a first stable state and a quasi-stable state; a third transistor; and means for interconnecting said second and third transistors to provide therebetween a bistable relationship in which said third transistor is switched in response to the switching of said second transistor and vice versa, whereby said multivibrator is provided with a second stable state as a result of said bistable relationship, operation of said circuit means being inhibited during said second stable state.

2. A latching pulse generator in accordance with claim 1 further comprising trigger input signal means for initiating the switching of said multivibrator from said first stable state to said quasi-stable state, said multivibrator switching to said second stable state upon termination of said quasi-stable state.

3. A latching pulse generator in accordance with claim 2 further comprising unlatch signal means connected to said third transistor for switching said multivibrator from said second stable state to said first stable state.

4. A latching pulse generator in accordance with claim 3 wherein said trigger input signal means comprises a trigger input signal terminal, a trigger signal path connecting said terminal to said first transistor, switching means, and means for operating said switching means to block transmission of trigger input signals along said signal path when said multivibrator is in said second stable state.

5. A latching pulse generator comprising a monostable multivibrator including first and second transistors, and having a first stable state and a quasi-stable state; a third transistor; means for interconnecting said second and third transistors to provide therebetween a bistable relationship in which said third transistor is switched in response to the switching of said second transistor and vice versa, whereby said multivibrator is provided with a second stable state as a result of said bistable relationship; trigger input signal means for initiating the switching of said multivibrator from said first stable state to said quasi-stable state, said multivibrator switching to said second stable state upon termination of said quasi-stable state; and unlatch signal means connected to said third transistor for switching said multivibrator from said second stable state to said first stable state, said unlatch signal means including an unlatch signal terminal and means connecting said unlatch signal terminal to said third transistor.

6. A latching pulse generator comprising a monostable multivibrator including first and second transistors, and having a first stable state and a quasi-stable state; a third transistor; means for interconnecting said second and third transistors to provide therebetween a bistable relationship in which said third transistor is switched in response to the switching of said second transistor and vice versa, whereby said multivibrator is provided with a second stable state as a result of said bistable relationship; trigger input signal means for initiating the switching of said multivibrator from said first stable state to said quasi-stable state, said multivibrator switching to said second stable state upon termination of said quasi-stable state; and unlatch signal means connected to said third transistor for switching said multivibrator from said second stable state to said first stable state; said trigger input signal means comprising a trigger input signal terminal, a trigger signal path connecting said terminal to said first transistor, switching means, and means for operating said switching means to block transmission of trigger input signals along said signal path when said multivibrator is in said second stable state; said switching means comprising a diode, and said operating means comprising circuitry including said third transistor for reverse biasing said diode when said multivibrator is in said second stable state.

7. A latching pulse generator in accordance with claim 6 wherein said operating means further comprises means connecting the collector of said third transistor to said diode, a source of potential, and means connecting said collector to said source of potential.

8. A latching pulse generator in accordance with claim 7 wherein said interconnecting means connects the base of each of said second and third transistors to the collector of the other.

9. In a latching pulse generator comprising a first and a second transistor, means connected to said first transistor for receiving trigger input signals, circuit means interconnecting said first and second transistors operative for switching said first and second transistors only when said first and second transistors are in respective initial states, said circuit means operating in response to a first trigger input signal and including first and second reswitching means, said first means reswitching said first transistor to its initial state and said second reswitching means being normally operative in response to said reswitching of said first transistor for reswitching said second transistor to its initial state; the improvement comprising latching means activated in response to said switching of said second transistor for inhibiting the operation of said second reswitching means, whereby operation of said circuit means in response to subsequently received trigger input signals is inhibited.

10. A latching pulse generator in accordance with claim 9 wherein said inhibiting means comprises a source of potential and switching means operative for connecting said source of potential to said circuit means.

11. A latching pulse generator in accordance with claim 10 further comprising means for deactivating said latching means including means for releasing said switching means.

12. A latching pulse generator in accordance with claim 11 wherein said switching means comprises a third transistor.

* * * * *